(No Model.)
J. S. MEREDITH.
CAR FENDER.
No. 570,134. Patented Oct. 27, 1896.
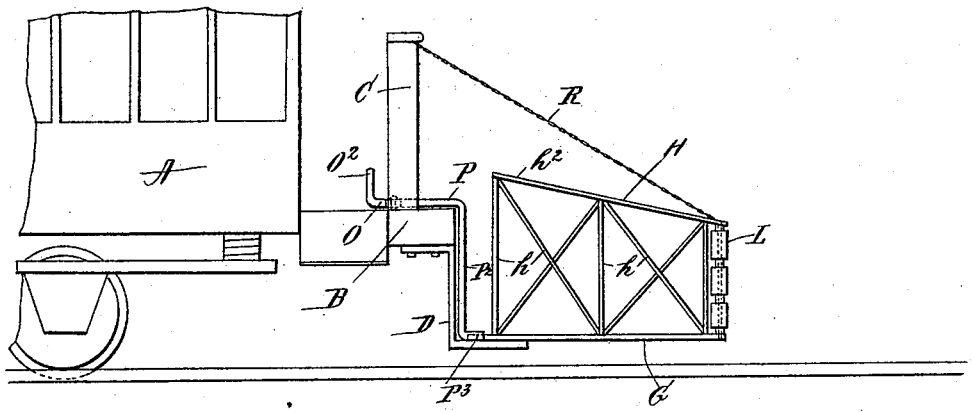
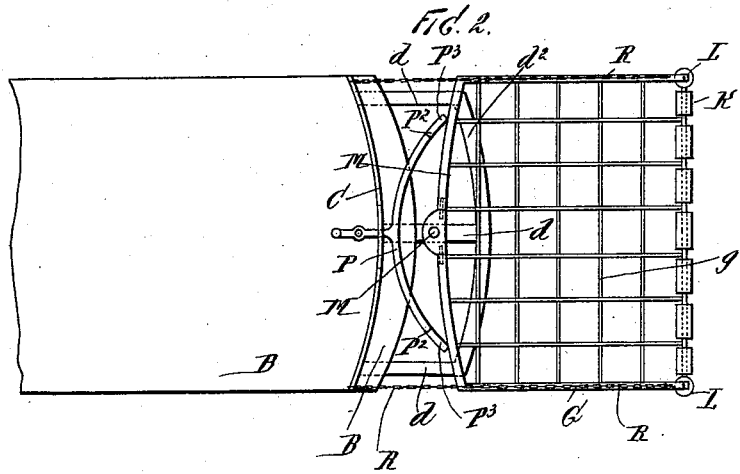
WITNESSES:
John Buckler,
C. Gerst
INVENTOR
James S. Meredith
BY
Edgar Tate & Co
ATTORNEYS.
THE NORRIS PETERS CO., PHOTO-LITHO., WASHINGTON, D. C.

UNITED STATES PATENT OFFICE.

JAMES SCOTT MEREDITH, OF PHILADELPHIA, PENNSYLVANIA.

CAR-FENDER.

SPECIFICATION forming part of Letters Patent No. 570,134, dated October 27, 1896.

Application filed March 10, 1896. Serial No. 582,566. (No model.)

*To all whom it may concern:*

Be it known that I, JAMES SCOTT MEREDITH, a citizen of the United States, and a resident of Philadelphia, in the county of Philadelphia and State of Pennsylvania, have invented certain new and useful Improvements in Car-Fenders, of which the following is a specification, reference being had to the accompanying drawings, forming a part thereof, in which similar letters of reference indicate corresponding parts.

This invention relates to fenders or guards for tramway-cars; and the object thereof is to provide a device of this class which is simple in construction and operation and which is adapted to prevent the serious and fatal results which sometimes follow the striking of a person or object by a car when in motion; and with this and other objects in view the invention consists in the construction, combination, and arrangement of parts hereinafter described and claimed.

The invention is fully disclosed in the following specification, of which the accompanying drawings form a part, in which—

Figure 1 is a side elevation of a car provided with my improved fender or guard, and Fig. 2 a plan view thereof.

In the drawings forming part of this specification, A represents the end of a car, B the platform thereof, and C the dashboard, and in the practice of my invention I secure to the forward end of the platform and to the bottom thereof a hanger D, composed of depending bars $d$, which are preferably three in number, and the lower ends of which are projected forwardly and united by a curved cross-bar $d^2$.

Pivotally connected with the central portion of the hanger D, or with the central bar thereof and resting thereon, is the main frame of my improved fender or guard, which comprises a bottom frame G, composed of side and end bars and horizontal and transverse rods $g$, and side frames H, which are composed of vertical and diagonal bars $h$ and the top bars $h^2$, and the forward end of the bottom frame G is provided with a plurality of rollers K, and the forward ends of the side frames H with a plurality of similar rollers L, and said rollers K and L may be composed of soft rubber or any other preferred material, and the object thereof is to provide a cushion which will break the force of the blow of a person or object struck by the fender or guard when the car is in motion.

The bottom frame G of the fender or guard is provided with an outwardly-curved rear cross-bar M, which forms a part thereof and by means of which the pivotal connection with the hanger is made at $m$, and pivotally connected with the bottom of the platform is a lever O, the rear end of which is upwardly curved or bent, as shown at $O^2$, and the front end of which passes through the dashboard and is secured to a segmental arm P, the ends of which are curved downwardly at $P^2$ and extend downward to the lower portion of the hanger, where they project forwardly, as shown at $P^3$, and bear upon the rear portion of the bottom frame G of the fender.

Secured to the forward end of the fender or guard are chains R, which extend backwardly and upwardly and are connected with the dashboard, and these chains serve to support the forward end of said fender or guard, and the operation will be readily understood from the foregoing description when taken in connection with the accompanying drawings.

The fender or guard is free to swing within certain limits on its pivotal connection with the chamber at $m$, and by means of the lever O the operator of the car or the driver or motorman may also assist in turning the fender or guard frame, the object of this being to keep said fender or guard in proper line in turning curves.

It will also be observed that the forward end of the fender or guard is held at a slight distance above the track, and if a person or object should be struck by the car when in motion such person or object would be thrown upon the bottom of the main frame of the fender or guard and be retained thereon by said frames, which constitute a portion thereof, and by means of the rollers K and L the force of the blow would be broken, and said person or object would be comparatively uninjured.

My improved fender or guard is well adapted to accomplish the result for which it is intended, and is also comparatively inexpensive, and, as will be readily understood, it may be easily attached to either end of a car.

Having fully described my invention, its construction and operation, I claim as new and desire to secure by Letters Patent—

1. The combination with a car, of a hanger secured to the platform thereof, and the bottom portion of which projects slightly above the track, a fender or guard pivotally connected with said hanger, and the rear portion of which rests thereon, the front end thereof being supported by chains or similar devices at a slight distance above the track, said chains being connected with the dashboard or other support, and said fender or guard being composed of a bottom frame and side frames, and the forward ends of the side frames being provided with rollers which serve as buffers, substantially as shown and described.

2. The combination with a car, of a hanger secured to the platform thereof, and the lower portion of which projects forward thereof and above the track, a fender or guard, the rear end of which rests upon said hanger and is pivotally connected therewith at the center thereof, a lever pivotally connected with the platform of the car, the rear end of which projects upwardly and the forward end of which is passed through the dashboard and connects with a segmental arm, the ends of which are bent downwardly and forwardly and bear upon the opposite sides of the fender or guard at the bottom thereof, and the forward end of said fender or guard being supported by means of chains or other devices which extend therefrom backwardly and upwardly to the dashboard, substantially as shown and described.

In testimony that I claim the foregoing as my invention I have signed my name, in presence of the subscribing witnesses, this 29th day of February, 1896.

JAMES SCOTT MEREDITH.

Witnesses:
THOS. WILKINSON,
JOSEPH THOMASSON.